W. H. RILEY.
ADJUSTABLE ARM REST.
APPLICATION FILED NOV. 3, 1915.
1,199,306.
Patented Sept. 26, 1916.
2 SHEETS—SHEET 1.
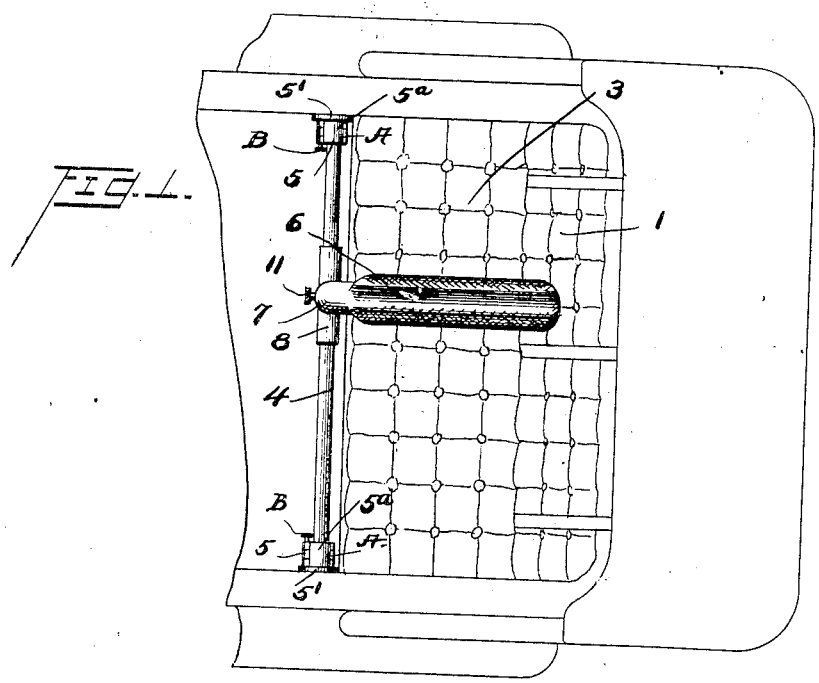
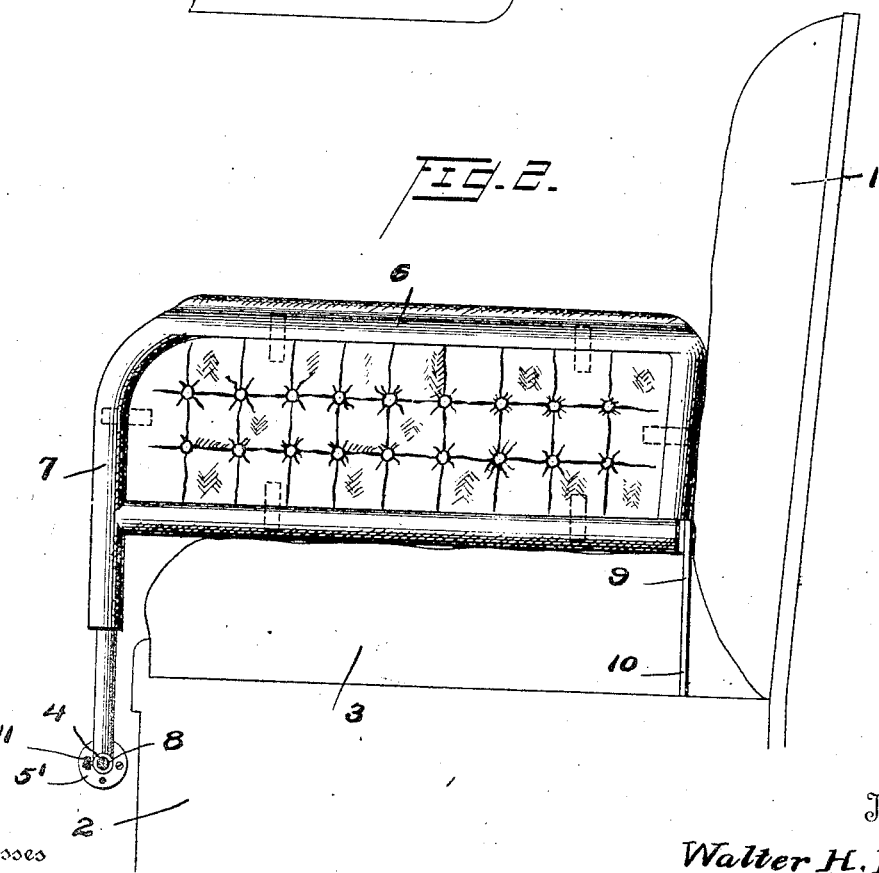
Witnesses
Harold Strauss
C. R. Seaman
Inventor
Walter H. Riley
By Robert H. Young
Attorney

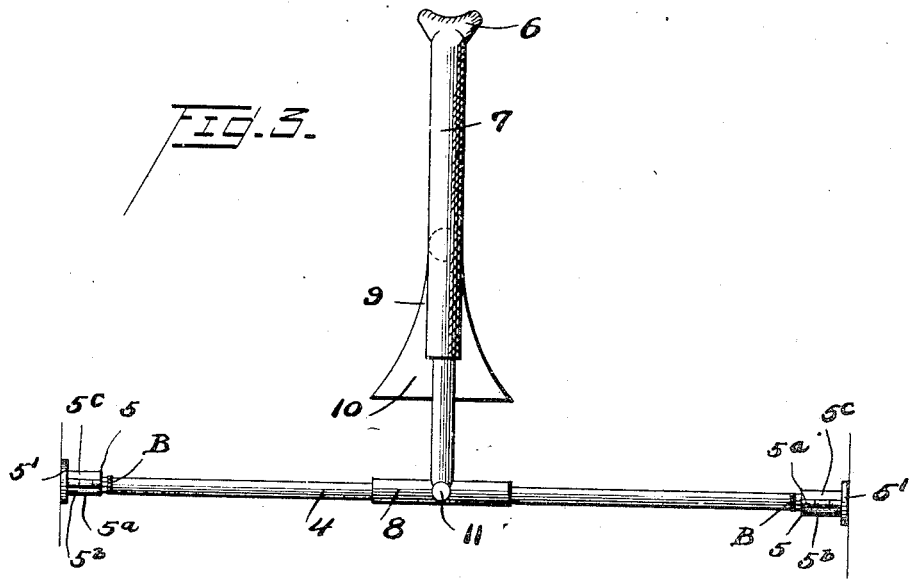

UNITED STATES PATENT OFFICE.

WALTER H. RILEY, OF BOGOTA, NEW JERSEY.

ADJUSTABLE ARM-REST.

1,199,306.  Specification of Letters Patent.  Patented Sept. 26, 1916.

Application filed November 3, 1915. Serial No. 59,426.

*To all whom it may concern:*

Be it known that I, WALTER H. RILEY, a citizen of the United States, and a resident of Bogota, in the county of Bergen and State of New Jersey, have invented new and useful Improvements in Adjustable Arm-Rests, of which the following is a specification.

My invention relates to arm rests, and pertains more particularly to supports of said character adjustably carried on the rear seats of automobiles intermediate of the sides thereof.

The object of my invention is to produce an arm rest of the character described adapted to be adjustably positioned transversely on a vehicle seat, and to serve as a lateral support for the bodies of the passengers seated on the seat as well as a support for their arms.

To these ends, my invention includes the combination and arrangement of component parts to be hereinafter described and more particularly pointed out in the claims.

In the accompanying drawings, in which like reference characters indicate similar parts, Figure 1 is a plan view of the rear seat of an automobile or other vehicle equipped with my arm rest; Fig. 2 is a side view of the same; Fig. 3 is a front view thereof; Fig. 4 is a vertical sectional view of my arm rest and body support. Fig. 5 is a detail perspective view of the slidable sleeve by which my arm rest is adjustably carried on a transverse supporting rod partly broken away; Fig. 6 is a detail perspective view of the split sockets in which the supporting rod is carried, and Fig. 7 is a detail sectional view of the rear end of my arm rest and body support.

Referring to said drawings, 1 designates the back of the rear seat of an automobile, and 2 indicates the seat portion on which the cushion 3 is carried. In front of said seat and below the top thereof, is transversely carried the rod 4 removably secured at its ends in the split sockets 5 secured on the opposite sides of the vehicle. Said sockets, as shown, comprise the base 5′ and the projecting cylinder 5ª, the latter of which comprises a fixed portion 5ᵇ and a free portion 5ᶜ hinged to the fixed portion at A and adapted to be locked at its other edge by the pin B.

My arm rest comprises the rectangular frame 6 carried vertically and longitudinally on the vehicle seat, above the cushion 3, having a depending arm 7 on its fore end, on the lower end of which is carried the horizontal sleeve 8; while the rear vertical member of the frame 6 is provided with the depending arm 9. Said depending arm 9 is flared laterally at its lower end 10 to provide a wide base to rest on the seat 2 between the upholstery of the back and seat cushions to prevent rocking of the frame. The sleeve 8 is adjustable longitudinally on the rod 4 and is provided with a set screw 11 to secure same in preferred position.

The back, seat and frame 6 may be upholstered and cushioned, and the top of the frame may be provided with one or two grooves in the cushions to comfortably accommodate the arms of the passengers on either side thereof.

It will be appreciated that my arm rest may be adjusted to the desired positions laterally to accommodate the size of the passengers and form a brace or lateral support for their bodies to prevent being thrown sidewise by the swerving of the vehicle; and it will be further apparent that my arm support may be conveniently raised and swung forward on the supporting rod when it becomes necessary to remove the seat cushion.

While, I have illustrated my invention as applied to the rear seats of automobiles, it will be obvious that it may be applied to seats of other vehicles or railway carriages.

Having thus described my invention, what I claim as new and desire to be secured by Letters Patent, is—

1. An arm support and partition for vehicle seats, comprising a partition wall carried on a vehicle seat longitudinal of the vehicle and extending substantially from the back to the front of the seat and downwardly to the horizontal plane thereof, and means for securing same in laterally adjusted positions.

2. An arm support for vehicle seats comprising a longitudinal body portion carried on a vehicle seat, means for securing same in laterally adjusted positions on the fore end thereof, and means for loosely supporting the rear end thereof.

3. An arm support for vehicle seats, comprising a longitudinal body portion, a depending arm on the fore part thereof, a laterally extending sleeve on the end thereof, a transverse rod removably secured in front of the vehicle seat on which said sleeve is removably carried, and a depending arm and flared plate on the rear of said body portion adapted to support the rear end thereof, substantially as described.

4. In an arm support for vehicle seats, the combination with a rectangular frame longitudinally positioned on a vehicle seat, of a depending arm on the fore part thereof, a laterally extending sleeve on the end of said arm, a transverse rod removably secured in front of the seat on which said sleeve is slidably mounted, means for securing said sleeve in fixed position, a depending arm on the rear of said frame having a laterally flared lower end adapted to rest on the rear of the seat structure, and a grooved arm rest carried on the top of said frame, substantially as described.

WALTER H. RILEY.